Jan. 13, 1970 R. R. GREENMAN ET AL 3,489,860

REMOTE TELEPHONE ON-HOOK, OFF-HOOK CONTROL

Filed June 30, 1966

INVENTORS: R. R. GREENMAN
L. E. KREBS
BY: Charles E. Graves
ATTORNEY

United States Patent Office 3,489,860

Patented Jan. 13, 1970

3,489,860

REMOTE TELEPHONE ON-HOOK, OFF-HOOK CONTROL

Robert R. Greenman, Carmel, Ind., and Luther E. Krebs, Matawan, N.J., assignors to Bell Telephone Laboratories Incorporated, Murray Hill, N.J., a corporation of New York Filed June 30, 1966, Ser. No. 561,827
Int. Cl. H04m *1/00, 1/02*
U.S. Cl. 179—81 15 Claims

ABSTRACT OF THE DISCLOSURE

The mode of a telephone set having a primary line switch located in the base is controlled by a recall switch in the handset. Connection of the two switches is afforded through an auxiliary circuit betwen handset and base such as a power supply circuit for a dial lamp. A logic function responsive to interruptions of the dial lamp circuit opens and closes a secondary line switch in the base.

Figure 2:
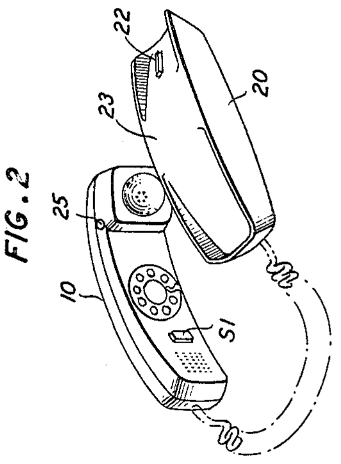

This invention relates to telephone substation circuits and in particular to one in which an existing connection to the telephone handset fulfills the added role of a remote line switch control.

As is well known, the electrical condition of a telephone line circuit is controlled normally by a switchhook line switch located in the telephone base. The switchhook includes a set of spring pile-ups which in response to movement of a plunger make and break connections between the telephone set and a wire pair leading to a central office. The plunger is biased to protrude normally into a handset cradle recess in which position the pile-ups make a connection with the central office and, in some designs, disconnect the set's ringer. The telephone is then in its off-hook mode. When the plunger is depressed manually or by the weight of the handset, the set reverts to its on-hook mode with the central office connection opened and the ringer reconnected.

Certain modern telephones such as those described in the copending applications of C. Kowaleski, Patent No. 3,396,244, filed Dec. 1, 1964 and L. N. Wilder, Patent No. 3,384,718, filed May 5, 1964, assigned to applicants' assignee, feature a reduced size illuminated dial that is located in the handset rather than in the telephone base. With this arrangement a user can position the dial in whatever manner he finds most comfortable for dialing. A remote line switch control added to this type handset represents a further user convenient since the telephone can then be operated completely independently of the base-mounted switchhook.

Control of the line switch from the handset normally entails running an added conductor pair to a switch in the handset which is serially connected to the line switch in the base. As disclosed in the cited patent of L. N. Wilder, one version of this control employs a push-break, release-make mechanical switch in the handset. This ararngement offers a momentary recall in which release of the handset switch restores the line connection.

If it is desired to retain the set in one or the other of its modes without need for keeping the handset button manually depressed, a double-acting mechanical push-button such as described in the cited application of C. Kowaleski may be used. Here, each push-release operation of the button changes the switchhook mode from on-hook to off-hook or vice versa. This scheme enables the user to place the set on-hook by operating the handset switch after which the handset can be set down unattended and away from the base sitchhook altogether. Hospital patients having a bedside telephone are among the users likely to fined this feature a decided convenience.

Fully electrical switches generally are more reliable and durable than switches employing mechanical linkages such as in the scheme last described. Electrical versions of this function designed to date, however, have been unduly complex and costly. More specifically, a major problem heretofore unsolved involves producing a handset-mounted switchhook control without adding further conductors between the handset and the base. In the telephones described in the above-mentioned patents, a first conductor pair is connected between handset and base for voice transmission, a second pair supply power for the dial lamp and a third pair is necessary to provide the recall function. This number of conductors in the handset cord make the cord bulky, difficult to coil and costly to produce. Importantly, any solution to this problem must economize on space and particularly cost.

Accordingly, a primary object of the invention is to enhance the utility of a dial-in-handset type telephone.

Another object of the invention is to improve the reliability of remote line switch controllers.

A further object of the invention is to reduce the complexity and cost of such controllers.

A more specific object of the invention is to control the mode of a telephone set from a handset-mounted recall switch without adding any further conductors to the handset cord.

These and other objects are achieved in accordance with the invention by a logic and control circuit responsive to interruptions of the dial lamp circuit effected through a handset-mounted switch for alternately opening and closing secondary line switch contacts connected with the base-mounted primary line switch.

In accordance with one embodiment of the invention, the logic circuit comprises a pair of transistors arranged as a bistable flip-flop with a relay incorporated into the collector circuit of one transistor. The relay is energized in only one of the two stable states. A trigger circuit generates a change-state signal whenever the dial lamp circuit recall switch is operated. The initial state of the flip-flop is established by an auxiliary unbalanced leg in the trigger circuit which operates when the handset is removed from the cradle. Means responsive to replacing of the handset on its cradle returns control of the line circuit completely to the base-mounted switchhook. Power for operation of the relay and transistor circuitry is derived from an A-C power supply shared with the dial lamp.

Pursuant to another aspect of the invention, the relay is energized into an electrically on-hook condition only through the logic circuit. The latter is energized only when the base or primary line switch is off-hook. Accordingly, the relay is operable to open the line circuit only when the primary line switch is off-hook and when the logic circuit is powered. Under these conditions, in the event of commercial power failure the relay will release if it is operated at the time, or will stay released if released at the time. This ensures that the additional or secondary switches in the line circuit will close so that the telephone can be used in conventional fashion.

An additional facet of the invention involves incorporating into the handset a visual indication of the mode of the telephone. A light guide optically coupled to the handset dial lamp terminates on either side of the handset in an amber "bull's-eye." The dial lamp is extinguished by the remote switch as well as by action of the line switch. The dial lamp serves as a visual indication of the mode of the line circuit and thus as a reminder to a user that the telephone may not be receptive to incoming calls.

Accordingly, a general feature of the invention relates to the dual usage of a secondary handset-to-base loop such as a dial lamp circuit, in which interruptions in that loop are turned to account to successively disconnect and reconnect the primary transducer loop from and to the primary line switch, and coincidentally to reconnect and disconnect the ringer.

Another feature of the invention involves a bistable circuit energized when the primary line switch is off-hook and which is responsive to successive interruptions of a dial lamp circuit for operating a secondary line switch.

An added feature of the invention relates to circuitry for initially setting the above-mentioned bistable circuit so that the secondary line switch is assured of being off-hook when the handset is removed from its cradle.

Figure 1:
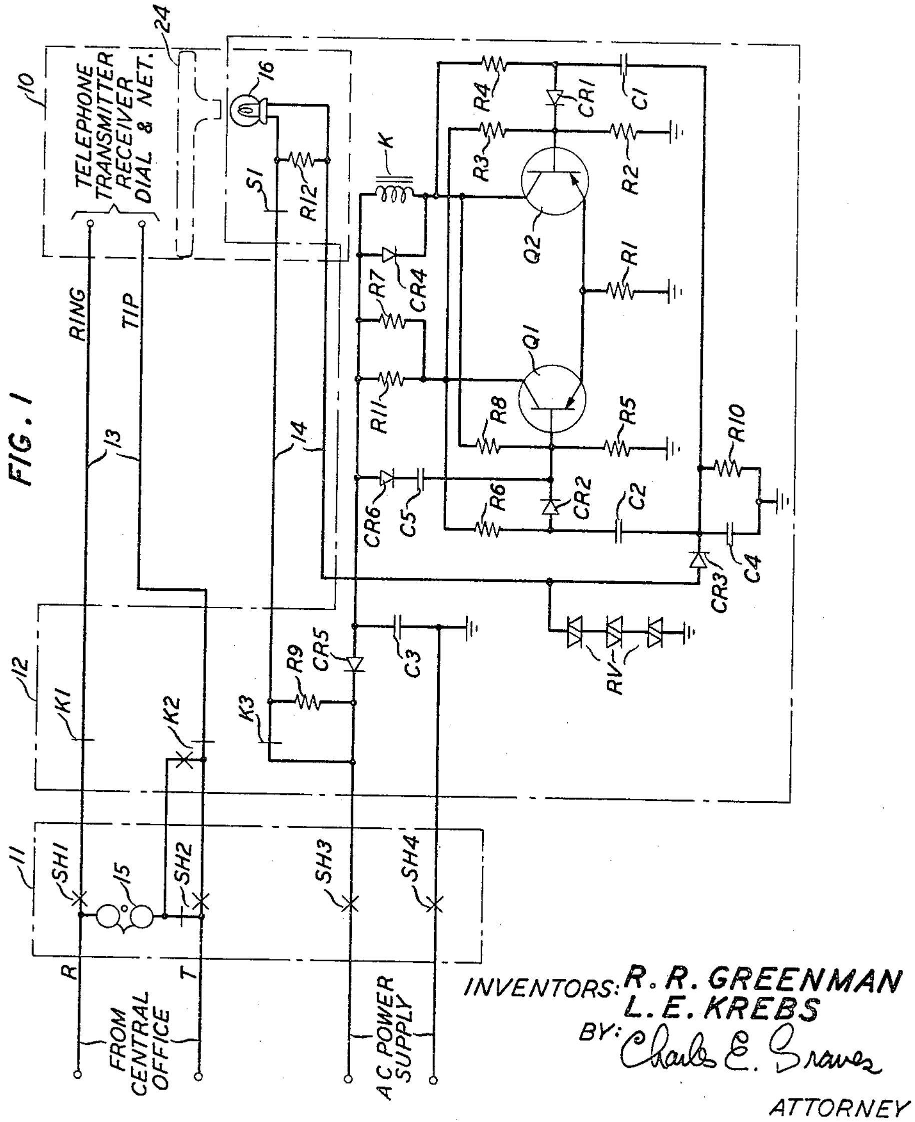

A complete understanding of the invention, its features and advantages may be gained from the detailed description to follow of an illustrative embodiment taken in conjunction with the drawing in which:

FIG. 1 is a schematic diagram of a telephone substation circuit embodying the inventive concept; and FIG. 2 is a schematic diagram of a telephone of the type having its dial in the handset, in which the inventive concept is employed.

The circuit diagram of FIG. 1 illustrates the application of the inventive principles herein described to a dial-in-handset type telephone desk set. The circuit may be classified broadly in terms of subcircuits which include line switch and ringer circuit 11, and logic circuit 12, both of which advantageously are located physically in a base 20. The referred-to line switch, consisting of contacts SH1, SH2, SH3 and SH4 to be described, comprises the primary line switch. A telephone handset denoted by 10 and including a telephone transmitter, a receiver, a dial, a network and a dial lamp 16, is connected to base 20 by means of tip-ring leads 13 and dial lamp power loop 14, in a manner to be described. The details of the transducer and dialing circuits are unimportant in the present invention and accordingly are not shown nor discussed.

Subcircuit 11 consists of conventional central office tip and ring connections T and R, a ringer 15 and the mentioned primary line switch contacts SH1 through SH4. Contacts throughout are illustrated by conventional detached contact notation in which an X denotes a make contact and a bar — indicates a break contact. As is conventional, a switchhook plunger such as 22, actuated by the weight of handset 10 when in its cradle 23, connects ringer 15 across the tip and ring leads by way of the break contact of SH2. When the handset is removed from its cradle, this connection is broken by the transfer of SH2, and a connection is made by means of the make contacts of SH1, SH2 to the transducer and dialing means of handset 10 through tip-ring leads 13.

Pursuant to the invention, a secondary line switch comprising make contact K1 and transfer contact K2 operated by a relay K is placed between the primary line switch contacts SH1, SH2 and the tip-ring leads 13 to handset 10. A break contact K3 of the secondary line switch is placed in the dial lamp circuit in a manner to be described. Contact K1 serves the same function as make contact SH1 with which it is in series, namely, to effect a connection between central office lead R and the handset ring lead. Similarly, transfer contact K2 serves the same function as transfer contact SH2, namely, to effect a connection between central office and either ringer 15 or the handset tip lead. As seen in FIG. 1, the on-hook mode of the telephone set is produced whenever contacts SH1, SH2 are unoperated, in which case ringer 15 is connected across central office leads R, T. Additionally, the on-hook mode is produced whenever contacts K1, K2 are operated even though contacts SH1, SH2 may be closed. In this case, ringer 15 is connected across leads R, T through the make contact of K2 and the make contact of SH2. The set's off-hook mode is produced when, and only when, contacts SH1 and SH2 are operated and contacts K1 and K2 are released. In such case, ringer 15 is open-circuited. In the sense just described, the primary line switch and the secondary line switch are said for convenience to be serially connected.

When the handset 10 is removed from its cradle 23, contacts SH3, SH4 of the primary line switch operate to apply power to lamp 16 from an A-C voltage source through a loop consisting of a normally closed contact K3, lamp loop 14, a normally closed recall switch S1 mounted on handset 10, the parallel combination of lamp 16 and resistor R12, back through lamp loop 14 and a varistor bank RV.

Secondary line switch contacts K1, K2, K3 are controlled by some suitable device such as a relay K. This combination, termed for convenience a control circuit, is so wired that the contacts perform their respective make, transfer and brake functions when the relay is energized, thereby placing the secondary line switch in its on-hook mode; and revert to their original off-hook state when the relay is de-energized.

Current to relay K for controlling the secondary line switch may be provided through any one of several suitable two-mode devices or circuits, as for example, the balanced bistable flip-flop comprising transistors Q1, Q2 with conventional resistive cross-coupling between collectors. In the illustrative embodiment shown in FIG. 1, relay K is incorporated into the collector circuit of transistor Q2. Direct-current power for the flip-flop and for relay K is supplied from the A-C lamp voltage source through contacts SH3, SH4 and a network including emitter resistor R1 and diode CR5.

It is necessary for the secondary line switch to be placed in its off-hook mode in response to removal of handset 10 from its cradle. Accordingly, pursuant to one aspect of the invention, an initial setting circuit operating in response to closure of the primary line switch contacts SH3, SH4 ensures that the flip-flop will be set initially with transistor Q1 on and transistor Q2 off. Specifically, with handset 10 removed the primary line switch operates and rectified power is applied to the flip-flop through the above-noted network. Charge builds on capacitor C3 which is connected across a circuit leg consisting of resistor R1, the emitter-to-base junction of transistor Q1, capactior C5 and Zener diode CR6. When the voltage across capacitor C3 exceeds the nominal breakdown voltage of Zener diode CR6, current flows in the mentioned circuit leg. This current flow forces transistor Q1 into saturation conduction. Saturation current flows through resistor R1, emitter to collector of transistor Q1 and the parallel combination of resistors R7 and R11, forcing the collector voltage of transistor Q1 to a low value and causing a voltage drop across resistor R1. The reduced collector voltage of transistor Q1 coupled through resistor R3 to the base of transistor Q2 is combined with the increased voltage across resistor R1 appearing at the emitter of transistor Q2, thereby forcing transistor Q2 into current cutoff. With transistor Q2 cut off, no current flows through the series circuit comprising transistor Q2 and relay K. Relay K thus remains unoperated; and consequently, the secondary line switch is ensured of being in its off-hook mode so that the telephone is ready for use.

At this point, the voltage at the collector of transistor Q2 is at a maximum. Resistor R8 couples the base of transistor Q1 to the high voltage of the transistor Q2 collector. This voltage applies a forward bias to the base of transistor Q1, maintaining saturation current flow in transistor Q1.

In the following manner, interruptions of the dial lamp current are detected and employed to produce changes in the state of the flip-flop. The collector-to-base leg of transistor Q1 includes a coupling resistor R6 and a diode CR2; and similarly, the corresponding leg of transistor Q2 includes a resistor R4 and a diode CR1. Connected in shunt relation to the diodes CR2, CR1 are capacitors C2, C1, respectively, to which triggering signals are applied.

With the application of power, dial lamp current flow produces an A-C voltage drop across varistor bank RV which is rectified by diode CR3 to produce a D-C voltage across the parallel combination of capacitor C4 and resistor R10. A positive charge upon the terminal of capacitor C4 effects a like positive charge upon the terminals of capacitors C2 and C1 with which it is in junction.

With transistor Q1 in saturation and transistor Q2 cut off as described above, the low collector voltage of transistor Q1 is coupled through resistor R6 to the negative terminal of capacitor C2 so that the latter has very little charge and diode CR2 is nearly zero biased. However, the high collector voltage present in transistor Q2 at this time is coupled through resistor R4 to charge capacitor C1 approximately to supply potential and to reverse bias diode CR1. Thus, with capacitor C2 discharged and capacitor C1 fully charged, the trigger circuit is conditioned to steer the reset pulses which have originated by recall switch S1.

Operation of recall switch S1 interrupts dial lamp current, which triggers an A-C voltage drop to zero across varistor bank RV. This removes the power source from diode CR3 and allows capacitor C4 to discharge through resistor R10.

The discharge of capacitor C4 represents a negative going voltage shift through capacitors C1 and C2, which provides additional reverse bias on diodes CR1 and CR2. This has no effect upon the state of the flip-flop because the voltage shift is blocked by the reverse-biased diodes CR1 and CR2. Upon release of recall switch S1, the dial lamp circuit is again closed and dial lamp current flows to product an A-C voltage drop across varistor bank RV. This is again rectified by diode CR3 and capacitor C4 is again charged. The charge build-up on capacitor C4 now reflects a positive going voltage shift through capacitor C2 which forward biases diode CR2. This causes current to flow through resistor R5 in parallel with the base emitter junction of transistor Q1, which forces a reduction in the collector current of transistor Q1 and a resultant rise in collector voltage of transistor Q1. The charge build-up on capacitor C4 also reflects a positive going voltage shift through capacitor C1. This reduces the reverse bias on the base of transistor Q2. Reduction of the transistor Q1 collector current in combination with an increase of the transistor Q1 collector voltage increases the base bias on transistor Q2 and allows collector current in transistor Q2 to rise. Collector current rise in transistor Q2 reduces the amount of base current coupled through resistor R8 to transistor Q1. This allows the collector current in transistor Q1 to approach cutoff; and as this takes place the collector voltage of transistor Q1 rises to provide sufficient current to be coupled through resistor R3 to allow saturation current to flow in transistor Q2. Saturation flow in transistor Q2 energizes relay K causing the latter to operate.

Operation of relay K actuates the break contacts of K1 and K2 which open-circuits tip ring leads 13 to the handset 10. Additionally, ringer 15 is reconnected between tip and ring leads T, R through make contact of K2 and the make contact of SH2. Thirdly, break contact K3 which normally completes a shorting path around resistor R9 is opened so that resistor R9 is placed in series with dial lamp 16. The value of resistor R9 is chosen so that the lamp current is below that required to produce visible illumination. This lamp current, however, is adequate bias current for varistor bank RV so that rectified current produced by diode CR3 again biases capacitor C4. This permits a further trigger pulse to be generated which has the described effect upon capacitors C1 and C2. Accordingly, a reset pulse generated by a further depressing and releasing of recall switch S1 will cause the flip-flop to return to the original state in which transistor Q1 is in saturation and transistor Q2 is in cutoff.

The combination of a depressing of the recall switch S1 followed by a release thereof is termed an "actuation." It is seen that whenever the primary line switch is operated, successive actuations of the recall switch alternate the telephone set between an on-hook and an off-hook mode.

Resistor R12 is placed in shunt with dial lamp 16 in the dial lamp circuit so that in event of lamp failure some current still flows in the dial lamp leads when relay K is operated. While considerably less than normal, this current is still adequate bias current for varistor bank RV to assure proper operation of the trigger circuit.

Relay K derives its energizing power through the primary line switch. Therefore, relay K can be energized only when the primary line switch is off-hook. Accordingly, the secondary line switch contacts K1, K2 close whenever relay K is de-energized. As a consequence, relay K responds to a commercial power failure exactly as it responds to opening of contacts SH3, SH4, thereby insuring that during power failure contacts K1, K2 will be closed to make the telephone set usable.

Similarly, there is no difference from a circuit viewpoint between application of power by switchhook contacts SH3, SH4 and abrupt restoration of commercial power. In either case the same state of the flip-flop logic is established. That is, owing to the initial current flow through resistor R1, emitter to base junction of transistor Q1, capacitor C5 and Zener diode CR6, transistor Q1 will be driven into saturation and transistor Q2 will be cut off. With transistor Q2 cut off, relay K does not operate and hence contacts T1, T2 remain closed. Thus, a telephone conversation in progress will not be interrupted by abrupt restoration of commercial power.

Other component functions are as follows: resistors R2 and R5 provide temperature and transient stabilization for the flip-flop; diode CR4 prevents inductive transients due to release of relay K from damaging transistor Q2; resistor R10 provides a discharge path for triggering circuit capacitor C4 to control maximum recycling rate.

Pursuant to a further facet of the invention, a visual indication of the mode of the telephone is achieved through a light guide 24 optically coupled to dial lamp 16 which, as shown in FIG. 2, terminates on either side of the handset in an amber bull's-eye 25 (only one shown). Dial lamp 16 is lit whenever the telephone circuit is connected through to the line circuit and is otherwise extinguished. Accordingly, the dial light and the amber light indicators in the side of the handset serve as a visual indication of the mode of the line circuit. Light guide 24 advantageously is formed of a piece of plastic such as Lucite and mounted in conventional fashion within handset 10. With this feature, a warning will be given to a user who puts handset 10 face down upon some surface remote from its cradle 23. Although light from the dial light might be obscured, the bull's-eye 25 would serve as a warning to a user that the telephone is in its off-hook mode and therefore not receptive to incoming calls.

It is apparent that the flip-flop circuit shown in the above-described illustrative embodiment need not be comprised of a pair of bistable transistors. Any conventional bistable device responsive to trigger circuit signals conveyed through an existing circuit in the manner described is regarded to be within the contemplation of this invention. The functions provided by transistor Q1 and transistor Q2, for example, may readily be achieved by a pair of electromechanical relays arranged in a flip-flop configuration. Alternatively, persons skilled in the art will recognize that the operation may be achieved by a single electromechanical relay having magnetic latching memory characteristics and suitable associated triggering circuitry.

One illustrative embodiment of the inventive concept has been shown and described. It is to be expressly understood that various changes and modifications may be made without departing from the spirit and scope of the invention.

What is claimed is:

1. A telephone set comprising:

a base having a primary line switch;

a handset;

first and second circuit loops connected between said primary line switch and said handset;
means for effecting interruptions in said first loop;
a bistable circuit;
means responsive to interrupts in said first loop for effecting a change-of-state in said bistable circuit; and
means responsive to successive said changes-of-state for alternately opening and closing said second loop.

2. A telephone set in accordance with claim 1, further comprising:
transducer and dialing means in said handset and connected to said primary line switch through said second loop;
a dial lamp;
means responsive to closure of said primary line switch for supplying power to said lamp through said first loop and for supplying power to said bistable circuit, said circuit having first and second modes;
means responsive to an initial energization of said bistable circuit for setting same in said first mode; and
means responsive to occurrence of said first mode for completing a circuit between said transducer and dialing means and said primary line switch;
whereby said transducer and dialing means are connected to said primary line switch when the latter is initially placed in off-hook condition and are successively disconnected and reconnected thereto in response to interruption in said first loop.

3. A telephone set in accordance with claim 2, further comprising:
means responsive to occurrence of said second mode for extinguishing said dial lamp.

4. A telephone set comprising:
a handset;
transducer means and dialing means in said handset;
a base;
a primary line switch in said base and connected to said transducer and dialing means;
a dial lamp mounted in said handset adjacent said dialing means;
means including a handset-mounted switch and said primary line switch for connecting said lamp to a power source;
a secondary line switch connected between said primary line switch and said transducer and dialing means; and
means responsive to successive actuations of said handset-mounted switch for alternately opening and closing said secondary line switch.

5. Telephone apparatus comprising:
a handset;
transducer means and dialing means in said handset;
a base;
a primary line switch in said base connecting said transducer and dialing means to central office leads;
a dial lamp in said handset;
a power source connected to said lamp through said primary line switch;
a handset-mounted switch for opening and closing said lamp power connections;
a secondary line switch serially connected between said primary line switch and said transducer and dialing means; and
means including a bistable circuit connected to said secondary line switch and responsive to successive actuations of said handset switch for alternately opening and closing said secondary line switch.

6. Telephone communications means comprising:
a handset;
transducer means and dialing means in said handset;
a base;
a primary line switch in said base connecting said transduced and dialing means to central office leads;
a dial lamp in said handset;
a power source connected to said lamp through said primary line switch;
a handset-mounted switch for opening and closing said lamp power connection;
a secondary line switch serially connected between said primary line switch and said transducer and dialing means;
a two-mode circuit responsive to an initial energization from said lamp power connection for assuming its first mode;
means including a trigger circuit responsive to successive actuations of said handset switch for alternating said two-mode circuit between its second and first modes; and
means responsive to occurrence of said first mode for closing said secondary line switch and further responsive to occurrence of said second mode for opening said secondary line switch.

7. Telephone communications means comprising:
a handset;
transducer means and dialing means in said handset;
a base;
a primary line switch in said base connecting said transducer and dialing means to central office leads;
a ringer in said base associated with said leads;
a dial lamp in said handset;
a power source connected to said lamp through said primary line switch;
a handset-mounted switch for opening and closing said lamp power connection;
a secondary line switch serially connected between said primary line switch and said transducer and dialing means;
a bistable flip-flop powered through said primary line switch and having a first mode and a second mode;
means responsive to closing of said primary line switch for placing said flip-flop in its first mode;
means including a trigger circuit responsive to successive actuations of said handset switch for alternating said flip-flop between its said modes; and
a control circuit connected to said flip-flop, responsive to said first mode for closing said secondary line switch and responsive to said second mode for opening said secondary line switch.

8. A telephone set in accordance with claim 7, wherein said control circuit further comprises means responsive to occurrence of said first mode for disconnecting said ringer and means responsive to occurrence of said second mode connecting said ringer across said leads.

9. A telephone set having on-hook and off-hook modes comprising:
a handset with transducer and dialing means therein;
a base with a primary line switch;
connections to a central office from said primary line switch;
means connecting said transducer and dialing means with said primary line switch;
a secondary line switch serially connected between said primary line switch and said transducer and dialing means;
a handset dial lamp;
means responsive to closure of said primary line switch for connecting said lamp to a power source;
a handset-mounted switch serially connected between said lamp and said source;
a bistable flip-flop circuit having first and second modes of operation;
initial setting means responsive to energization of said lamp circuit for setting said flip-flop in said first mode;
means including a trigger circuit connected to said flip-flop circuit responsive to successive actuation of said handset-mounted switch for changing states of said flip-flop to alternately produce said second and said first modes after said initial setting; and control means responsive to occurrence of said first mode for closing said secondary line switch, and further responsive to occurrence of said second mode for opening said secondary line switch, whereby said set is placed in its on-hook mode without closure of said primary line switch.

10. A telephone set in accordance with claim 9, wherein said control means comprises a relay and means responsive to operation and release of said relay for alternately opening and closing said secondary line switch.

11. A telephone set in accordance with claim 10, wherein said bistable flip-flop circuit comprises first and second transistors connected as a bistable switch, said relay being serially connected in the collector circuit of said second transistor.

12. A telephone set in accordance with claim 11, wherein said trigger circuit comprises means for resistively coupling the collector of each said transistor to the base of the opposite transistor, means including a diode and a coupling capacitor serially connected to the base of each transistor for applying change-state signals to each transistor, a parallel RC network having a common terminal with said coupling capacitors, a D-C voltage source derived from said A-C source, and means including said handset-mounted switch for applying said D-C voltage to said common terminal.

13. A telephone set in accordance with claim 12, wherein said dial lamp circuit further comprises means including a break contact of said secondary line switch in series relation with said source and with said handset-mounted switch and a resistor in shunt relation with said break contact responsive to opening of said secondary line switch for unshorting said resistor thereby decreasing lamp current sufficiently to extinguish same; whereby although said lamp is out indicating an on-hook condition, the mode of said set is still controlled through said handset-mounted switch, said flip-flop and said secondary line switch.

14. A telephone set in accordance with claim 13, wherein said initial setting means comprises a first circuit leg including a first resistor, the emitter-base junction of said first transistor, a first capacitor, a Zener diode and a rectifying diode in series relation; and a second circuit leg including a second capacitor and said rectifying diode in series relation with said A-C source, said second capacitor being in shunt relation with said Zener diode, application of power to said second leg changing said second capacitor voltage to break down said Zener diode, causing conduction in said first leg, said conduction forcing said first transient into saturation conduction and forcing said second transistor into current cutoff.

15. A telephone set in accordance with claim 14, wherein said handset further comprises light-conducting means mounted adjacent said lamp and extending to opposite exterior sides of said handset, said last-named means serving as an indicator of the connection mode of said set.

No references cited.

WILLIAM C. COOPER, Primary Examiner

U.S. Cl. X.R.

179—100, 167